June 25, 1963  P. DÖME  3,095,528
ELECTROMAGNETIC DEVICE FOR MAINTAINING THE OSCILLATORY
MOVEMENT OF A BALANCE WHEEL COMPRISING A HAIR SPRING
Filed May 21, 1959

INVENTOR
PETER DÖME
BY John B. Summahart
ATTORNEY

United States Patent Office 3,095,528
Patented June 25, 1963

3,095,528
ELECTROMAGNETIC DEVICE FOR MAINTAINING THE OSCILLATORY MOVEMENT OF A BALANCE WHEEL COMPRISING A HAIR SPRING
Peter Döme, Geneva, Switzerland, assignor to Societe Suisse pour l'Industrie Horlogere S.A., Geneva, Switzerland, a firm of Switzerland
Filed May 21, 1959, Ser. No. 814,892
Claims priority, application Switzerland May 24, 1958
4 Claims. (Cl. 318—132)

The present invention relates to an electromagnetic device for maintaining the oscillatory movement of a balance wheel comprising a hair spring.

As is known, there exist two known types of such devices, namely those comprising electric contacts and those comprising transistors.

However, known devices of both types have many disadvantages. The contact devices have all the disadvantages inherent in the use of contacts. With regard to transistor devices, these generally utilise the principle of magnetic attraction, which gives rise to force components which, since they are not tangential to the balance wheel, interfere with the movement of the latter. On the other hand, the magnetic circuits employed in devices of both types are generally such that the balance wheel is subjected to the action of magnetic moments due to external magnetic fields such as, for example, the earth's field. Finally, in the majority of known transistor devices, the arrangement of the driving and control coils is such that special magnetic circuits are necessary for the control coil.

The device according to the invention has for its object to obviate the aforesaid disadvantages by virtue of the fact that the balance wheel supports three magnetic elements, of which at least one is a permanent magnet, the said three elements being polarised along the axis of the balance wheel and being so disposed that the direction of the flux through the centre element is opposite to that in the two outer elements, two electric windings being disposed opposite one another, each in a plane perpendicular to the axis of the balance wheel, so that during the oscillatory movement of the latter the three elements pass between the said windings, the latter being connected through a transistor which is in turn connected to a direct-voltage source, the whole arrangement being such that the current induced in one of the two windings as a result of the variation of the flux extending therethrough is amplified in the other winding and generates a force which imparts a mechanical impulse to the said balance wheel in the direction of its movement.

Figure 2:
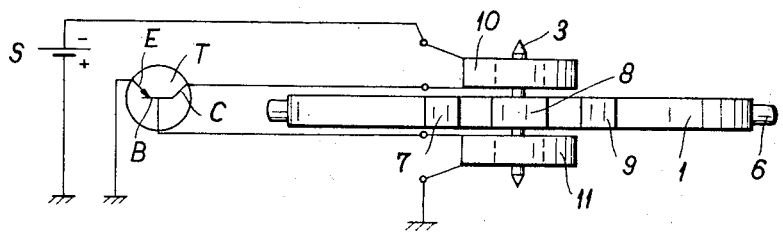
Figure 1:
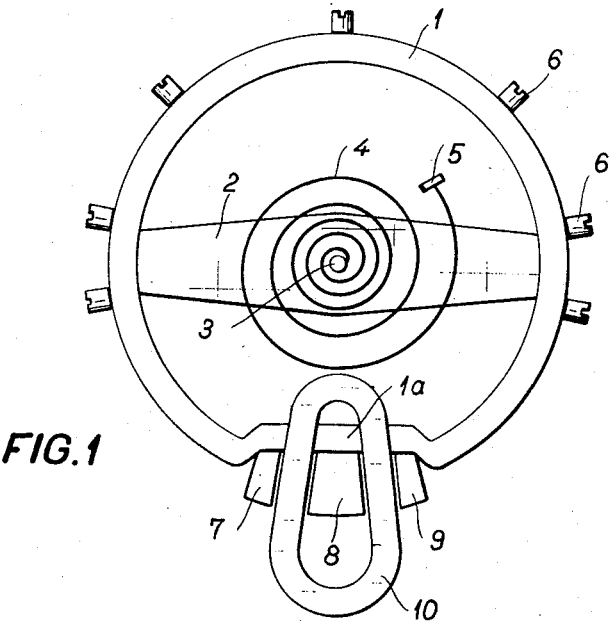
Figure 3:
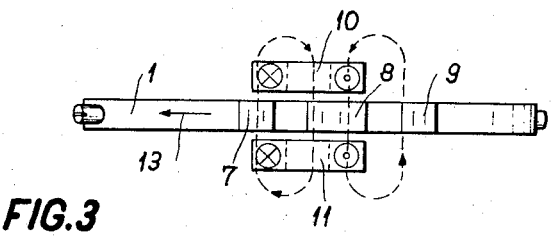

A constructional form of the device according to the invention is diagrammatically illustrated by way of example in the accompanying drawings, in which:

FIG. 1 is a plan view,
FIG. 2 is an elevational view diagrammatically showing the electrical connections, and,
FIG. 3 shows the balance wheel in another position, as also the electromagnetic circuits.

As will be seen from FIGS. 1 and 2, the device comprises a circular balance wheel 1 connected by way of a cross-member 2 to a staff 3, of which the two ends are designed to pivot in bearing (not shown). A hair spring attached at one end to the staff 3 and at the other end to a fixed member 5 is designed to drive the balance wheel 1 with an oscillatory movement. Mounted on the periphery of the balance wheel 1 are a number of screws 6 by means of which it can be balanced. Fixed on a flattened portion 1a of the periphery of the balance wheel 1, for example by a suitable adhesive, are three permanent magnets 7, 8 and 9, which are polarised along the axis of the balance wheel in such manner that the direction of the flux extending through the centre magnet 8 is opposite to the direction of the fluxes extending through the two outer magnets 7 and 9 (shown in chain lines in FIG. 3).

Two electric windings 10 and 11 are disposed opposite one another, each in a plane perpendicular to the staff 3 of the balance wheel 1, in such manner that, during the oscillatory movement of the latter, the magnets 7 to 9 can pass between the two windings. The said windings 10 and 11 are fixed and are so located that their position in relation to the magnets 7 to 9 is as illustrated in FIGS. 1 and 2, when the balance wheel 1 is situated in the position of rest or equilibrium, in which the action of the hair spring 4 is zero.

It is to be noted that the distance between two neighbouring magnets is so chosen as to be at least equal to the thickness of the windings 10 and 11.

The winding 10 is connected on the one hand to the negative pole of a direct-voltage source S and on the other hand to the collector C of a transistor T, for example of the p-n-p type. The winding 11 is connected on the one hand to the base B of the transistor T and on the other hand to earth. The emitter E of the transistor T and the positive pole of the source S are also connected to earth.

The oscillatory movement of the balance wheel 1, due to the action of the hair spring 4, is maintained in the following manner:

It will be assumed that the balance wheel, in carrying out a counter-clockwise movement, has reached its extreme right-hand position (in relation to the drawing). As the flux of the magnets 7 to 9 does not go through the control winding 11, no voltage is induced. The transistor T is therefore not in the conducting state, and no current goes through the motor winding 10. Under the action of the spring 4, the balance wheel will carry out a return movement towards its position of rest illustrated in the drawing, i.e. towards the windings 10 and 11. When a magnetic flux passes through the latter, the variation of the said flux, owing to the passage of the magnets mounted on the balance wheel, will cause a voltage to be induced in the said windings. Now, the dimensioning of all the elements of the device is such that for each of two periods for a given direction of rotation of the wheel a voltage is induced in the winding 11, and therefore the voltage applied to the base B of the transistor, is sufficient to render the latter conductive. There will therefore flow through the winding 10 two current impulses whose direction is so chosen that the so-called Laplace force resulting from the pressure of a conductor carrying a current in a magnetic field, will have the direction indicated by the arrow 13 (FIG. 3) and therefore the direction of movement of the balance wheel. The latter will therefore receive two mechanical impulses, the one just before and the other just after it passes through its position of rest (zero action of the spring), the forces being tangential to the wheel) and will continue its movement until it reaches its extreme left-hand position, whence it will return under the action of the spring. Now, it will readily be seen that the same cycle will be repeated on the inverse movement of the balance wheel, which is to say, the latter will receive two new impulses in the direction of its movement, and so on.

The balance wheel will therefore receive at each half-cycle of its oscillatory movement two mechanical impulses in the direction of its movement.

It will readily be seen from the foregoing that the device according to the invention has numerous advantages over the known devices.

By reason of the fact that the force of magnetic attraction is not utilised, but the so-called Laplace force, on the one hand, and due to the absence of any effective magnetic air gap, on the other hand, any force which is not tangential to the balance wheel can be eliminated.

The number of magnetic circuits and their form, determined by the number of magnetic elements and by the direction of their polarisation, permit of obtaining, before and after each passage of the balancing wheel through its position of rest, an induced voltage impulse of like sign, independently of the direction of the movement of the balance wheel, and of eliminating any influence which might be exerted on the latter by an external magnetic field.

The arrangement of the driving and control windings opposite to one another permits of utilising the same magnetic circuits and consequently of dispensing with the special magnetic circuit comprised in the majority of known devices for the control winding.

In addition, this arrangement permits of obtaining a feed-back coupling or increase in the amplitude of the voltage induced in the control winding 11, which increase is due to the magnetic field created by the current circulating in the motor winding 10. The feedback coupling is variable and maximum when the balance wheel passes through its inoperative position, since the reluctance between two windings is minimum when the magnetic elements are situated between them. On the other hand, since the direction of the current in the windings is the same, this feedback coupling is positive.

Finally, by reason of its construction, the device according to the invention is of very small overall dimensions, which is also a great advantage.

It is also to be noted that, since the distance between two magnetic elements is at least equal to the thickness of the windings, the utilisation of the magnetic flux and of the copper volume is optimum.

In the constructional form of the device as hereinbefore described, the three magnetic elements consist of permanent magnets. Of course, this is not essential and in a variant it would be possible to provide a device in which only one of the three elements is a permanent magnet, the other two consisting of magnetic material having a high coefficient of permeability. It is obvious that in this case the member consisting of the permanent magnet would have to be located in the centre, in order to obtain magnetic circuits according to the invention. In another variant, two of the three elements, notably the two outer elements, could be permanent magnets, the third consisting of magnetic material having a high coefficient of permeability.

It will be obvious that the magnetic elements could be fixed on the periphery of the balance wheel in any manner other than that described in the example. For example, they could be set into the balance wheel, or into a special member, which would in turn be fixed on the balance wheel.

What I claim is:

1. In an electric device for maintaining oscillating movement, said device comprising a balance wheel having a hair spring, three magnetic elements on said balance wheel, of which at least one is a permanent magnet, said permanent magnet being polarized on an axis parallel to the axis of said balance wheel and said three elements being so disposed that the direction of flux through an intermediate one of the three elements is opposite to that of the outer two elements, a transistor and a direct-voltage source connected to said transistor, and two magnetically coreless windings disposed opposite each other, each in a plane perpendicular to the axis of said balance wheel and so connected with said transistor that in movement of said magnetic elements relative to said windings, for each half-cycle of oscillation of the balance wheel, each of two pulses of like polarity comprised in voltage induced in one of said two windings as the result of flux variations through said winding prompted by different relative positions of said magnetic elements to said winding, is amplified in the other of said windings causing a current impulse and an accompanying Laplace effect endowing the balance wheel with a mechanical impulse in the direction that the wheel is moving in the corresponding half-cycle of oscillatory movement.

2. A device as claimed in claim 1, in which said windings are fixed and are so located that the passage of said magnetic elements between them takes place during the passage of the balance wheel through its position of rest.

3. A device as claimed in claim 1, in which said magnetic elements are laterally spaced one from another a distance which is at least equal to the related inside to outside thickness dimension of each of said windings.

4. A device as claimed in claim 1, in which said magnetic elements are disposed on the periphery of the balance wheel.

References Cited in the file of this patent

UNITED STATES PATENTS

| 2,831,114 | Van Overbeek | Apr. 15, 1958 |
| 2,950,447 | McShan | Apr. 23, 1960 |

FOREIGN PATENTS

| 1,092,411 | France | June 3, 1957 |